(12) United States Patent
Miyazaki et al.

(10) Patent No.: US 8,345,275 B2
(45) Date of Patent: Jan. 1, 2013

(54) IMAGE FORMING APPARATUS FOR REPLACING PAGE DATA EXPRESSED BY UNSUPPORTED FORMAT

(75) Inventors: Sadaaki Miyazaki, Nagoya (JP); Koshi Fukazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1376 days.

(21) Appl. No.: 11/878,501

(22) Filed: Jul. 25, 2007

(65) Prior Publication Data

US 2008/0024812 A1    Jan. 31, 2008

(30) Foreign Application Priority Data

Jul. 26, 2006    (JP) ................................. 2006-203008

(51) Int. Cl.
*G06K 15/00*    (2006.01)
(52) U.S. Cl. .................... 358/1.14; 358/1.13; 358/1.15; 358/1.16; 358/1.17; 358/1.18; 348/207.2
(58) Field of Classification Search ................ 358/1.14; 348/207.2
See application file for complete search history.

(56) References Cited

U.S. PATENT DOCUMENTS

| 6,879,408 | B1* | 4/2005 | Hori et al. ..................... 358/1.13 |
| 6,940,615 | B1* | 9/2005 | Shima .......................... 358/1.15 |
| 7,903,268 | B2* | 3/2011 | Aoki et al. .................... 358/1.14 |
| 2001/0000541 | A1* | 4/2001 | Schreiber et al. ............. 713/100 |
| 2001/0040693 | A1* | 11/2001 | Saito et al. ................... 358/1.15 |
| 2005/0007626 | A1* | 1/2005 | Takaiwa ........................ 358/1.15 |
| 2005/0052676 | A1* | 3/2005 | Masumoto et al. .......... 358/1.13 |
| 2005/0179932 | A1* | 8/2005 | Matsuda ....................... 358/1.14 |
| 2005/0206941 | A1* | 9/2005 | Shima .......................... 358/1.13 |
| 2006/0044602 | A1* | 3/2006 | Kitahara et al. ............. 358/1.15 |
| 2006/0153615 | A1* | 7/2006 | Kamei .............................. 400/62 |
| 2006/0259590 | A1* | 11/2006 | Tsai et al. ...................... 709/219 |
| 2006/0279636 | A1* | 12/2006 | Sasaki .......................... 348/207.2 |
| 2007/0025752 | A1* | 2/2007 | Maeda et al. ..................... 399/81 |
| 2007/0177187 | A1* | 8/2007 | Hisatomi ..................... 358/1.15 |
| 2007/0211941 | A1* | 9/2007 | Suzuki .......................... 382/180 |
| 2010/0073702 | A1* | 3/2010 | Shima .......................... 358/1.13 |

FOREIGN PATENT DOCUMENTS

| EP | 0881565 A2 | 12/1998 |
| EP | 0923226 A1 | 6/1999 |
| JP | 8-156372 | 6/1996 |
| JP | 11-277855 | 10/1999 |
| JP | 2001-328314 A | 11/2001 |
| JP | 2003-108325 | 4/2003 |
| JP | 2003-141047 | 5/2003 |
| JP | 2004-96688 A | 3/2004 |
| JP | 2004-338308 A | 12/2004 |
| JP | 2005-174261 | 6/2005 |
| JP | 2005-174261 A | 6/2005 |
| JP | 2006-164029 | 6/2006 |

OTHER PUBLICATIONS

European Patent Office; European Search Report in European Patent Application No. 07252962.1 mailed Mar. 8, 2010.

(Continued)

*Primary Examiner* — Benjamin O Dulaney
(74) *Attorney, Agent, or Firm* — Baker Botts L.L.P.

(57) ABSTRACT

An image forming apparatus includes an acquisition unit that acquires a file stored in a storage medium, an expansion unit that expands the acquired file, an expansion control unit that controls the expansion unit to skip expanding of unexpanded data that is found to be impossible to expand from the file and to continue the expanding of the file, and a print unit that executes printing in accordance with expanded data from the file.

11 Claims, 16 Drawing Sheets

OTHER PUBLICATIONS

Japanese Office Action, with Partial English Translation, issued in Japanese Patent Application No. JP 2006-203008, dated Jan. 13, 2009.

Japanese Notification of Reasons for Refusal, with English Translation, issued in Japanese Patent Application No. JP 2006-203008, dated May 20, 2008.

* cited by examiner

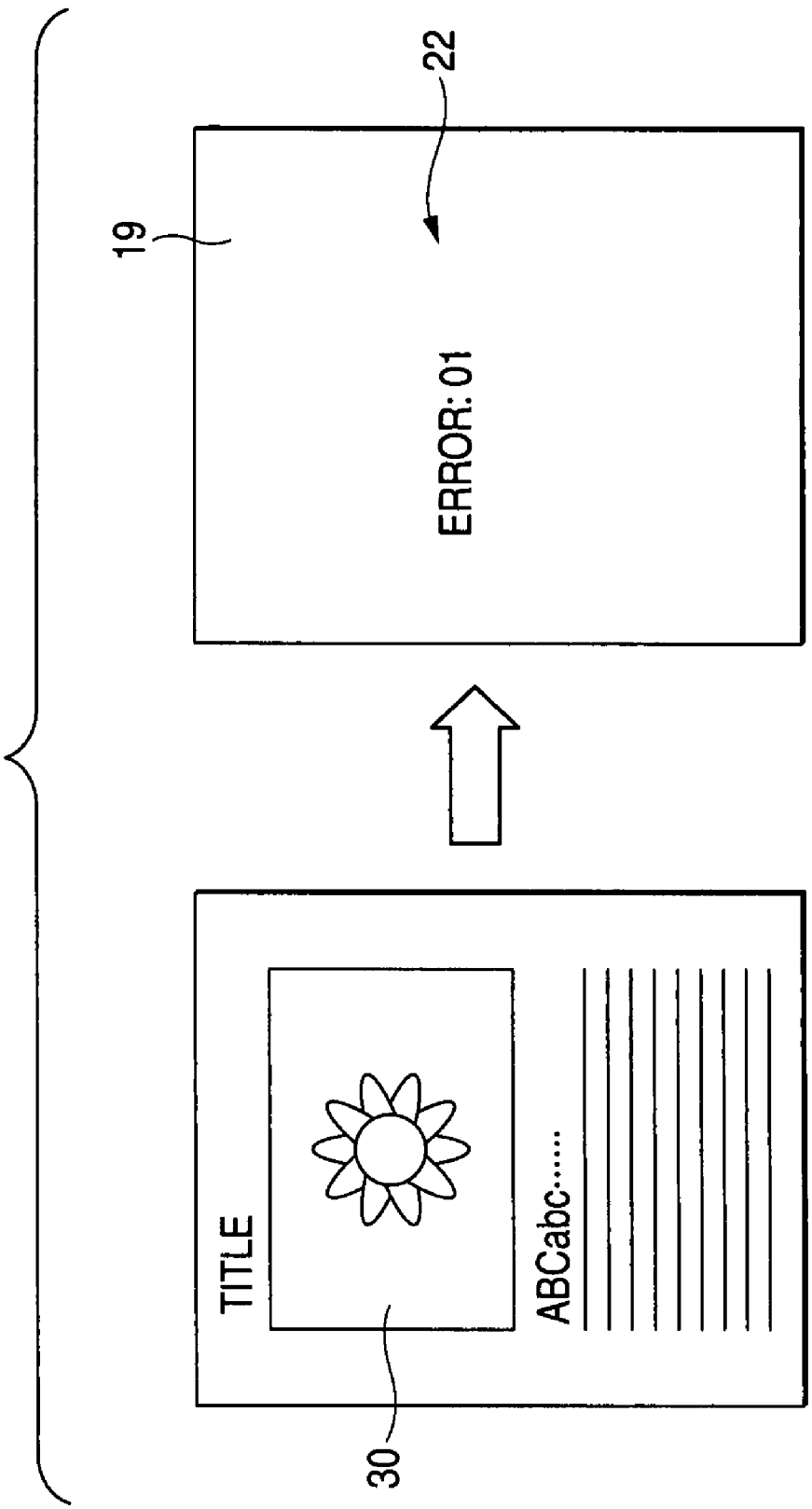

ial Replacement Mode; Replacement with an error image);
IMAGE FORMING APPARATUS FOR REPLACING PAGE DATA EXPRESSED BY UNSUPPORTED FORMAT

CROSS-REFERENCE TO RELATED APPLICATIONS

This application claims priority from Japanese Patent Application No. 2006-203008 filed on Jul. 26, 2006, the entire subject matter of which is incorporated herein by reference.

TECHNICAL FIELD

Aspects of the present invention relate to an image forming apparatus having a direct print function of effecting printing by capturing a file directly from a storage medium.

BACKGROUND

JP-A-2005-174261 discloses an image forming apparatus that enables direct attachment of a storage medium (e.g., a memory card) where files such as photographic images or the like captured by a digital camera are stored. The related image forming apparatus has a direct print function of reading files stored in this storage medium and subjecting the files to print processing.

In contrast with PC printing in which print data are received from a personal computer and printed, direct printing does not involve use of a printer driver. For example, a file may include data of a format which cannot be originally expanded by the image forming apparatus or data which is corrupt and cannot be expanded. Therefore, the related image forming apparatus is configured to end in an error upon detection of data which cannot be expanded and to abort subsequent print processing.

SUMMARY

Aspects of the present invention provide an image forming apparatus which can obviate a problem of printing operation being stopped by data which cannot be expanded.

According to an aspect of the invention, there is provided an image forming apparatus including: an acquisition unit that acquires a file stored in a storage medium; an expansion unit that expands the acquired file; an expansion control unit that controls the expansion unit to skip expanding of unexpanded data that is found to be impossible to expand from the file and to continue the expanding of the file; and a print unit that executes printing in accordance with expanded data from the file.

According to the aspects of the invention, even if a file contains data which cannot be expanded, the data can be printed to the last without print processing being stopped in midstream.

BRIEF DESCRIPTION OF THE DRAWINGS

FIG. 14 is a diagrammatic illustration showing a relationship between an original image of a file and a replaced image (Entire Page Replacement Mode; Replacement with an error message image);

DETAILED DESCRIPTION

Illustrative aspects of the present invention will be described with reference to the drawings.

1. Exemplary Structure of a Printer

A printer 10 (one example of an image forming apparatus) of the present aspect has a PC print function and a direct print function. The PC print function includes receiving print data from a host computer (not shown), and the like, and printing the data. The direct print function includes directly reading image data stored in external memory, such as USB memory 17 (one example of storage medium), and printing the read image data. The printer 10 has the following characteristic configuration in connection with the direct print function.

Figure 1:
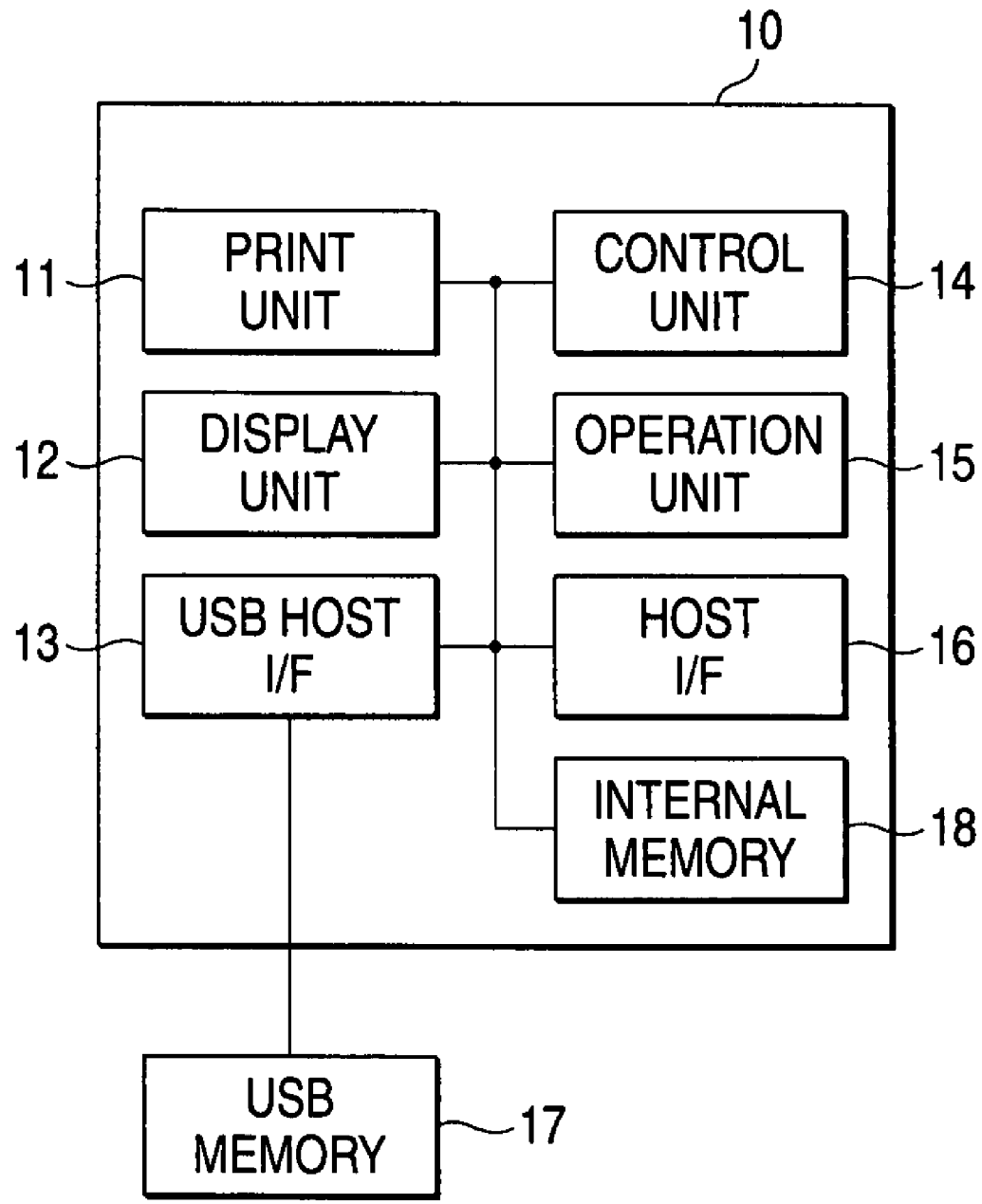
FIG. 1 is a simplified view showing the hardware configuration of a printer according to a first exemplary embodiment of the present invention.

FIG. 1 is a schematic diagram showing the hardware configuration of the printer 10. The printer 10 has a print unit 11 for subjecting a sheet 19 (one example of a printing medium) to printing; a display unit 12; a USB host I/F 13; a control unit 14; an operation unit 15 operated by a user; a host I/F 16; and internal memory 18. Substitute data of a plurality of patterns, which will be described later, as well as a program for controlling the overall operation of the printer 10 are stored in the internal memory 18 (one example of a substitute for a data storage unit). The control unit 14 has a CPU and controls operation of the print unit 11 and operation of the display unit 12 in accordance with the program stored in the internal memory 18. Moreover, the printer 10 can establish data communication with the host computer by way of the host I/F 16. The USB memory 17 is removably attached to the printer 10, and information in the USB memory 17 is read into the control unit 14 by way of the USB host I/F 13. Accordingly, the USB host I/F 13 and the control unit 14 act as acquisition units.

Files of various formats are stored in the USB memory 17. A file including data of a format which is not supported and cannot be expanded by the printer 10 [e.g., sound data, motion picture data, data of joint photographic experts group (JPEG) 2000 format, and the like] can be present in the files. Further, a file including data which are corrupt and cannot be expanded by the printer 10 can also be present in the files. Such data which cannot be expanded are called as unexpanded data.

The operation unit 15 is arranged so as to be able to select an entire-page replacement mode and a partial replacement mode through predetermined operation, when the unexpanded data are detected during expansion of the file. The entire-page replacement mode includes replacement of an entire page including unexpanded data with substitute data. The partial replacement mode includes replacement of only unexpanded data with substitute data. Moreover, the operation unit 15 is also arranged to be able to select, through predetermined operation and in each mode, replacement of an image corresponding to unexpanded data (hereinafter called an unexpanded image) with an error image 20 (e.g., a view showing "unsupported format") representing an error, space (blank) 21, or an error message image 22 including an error message (e.g., a message showing the cause of an error). At this time, the operation unit 15 acts as a selection unit.

2. Control Specifics of the Control Unit

Figure 2:
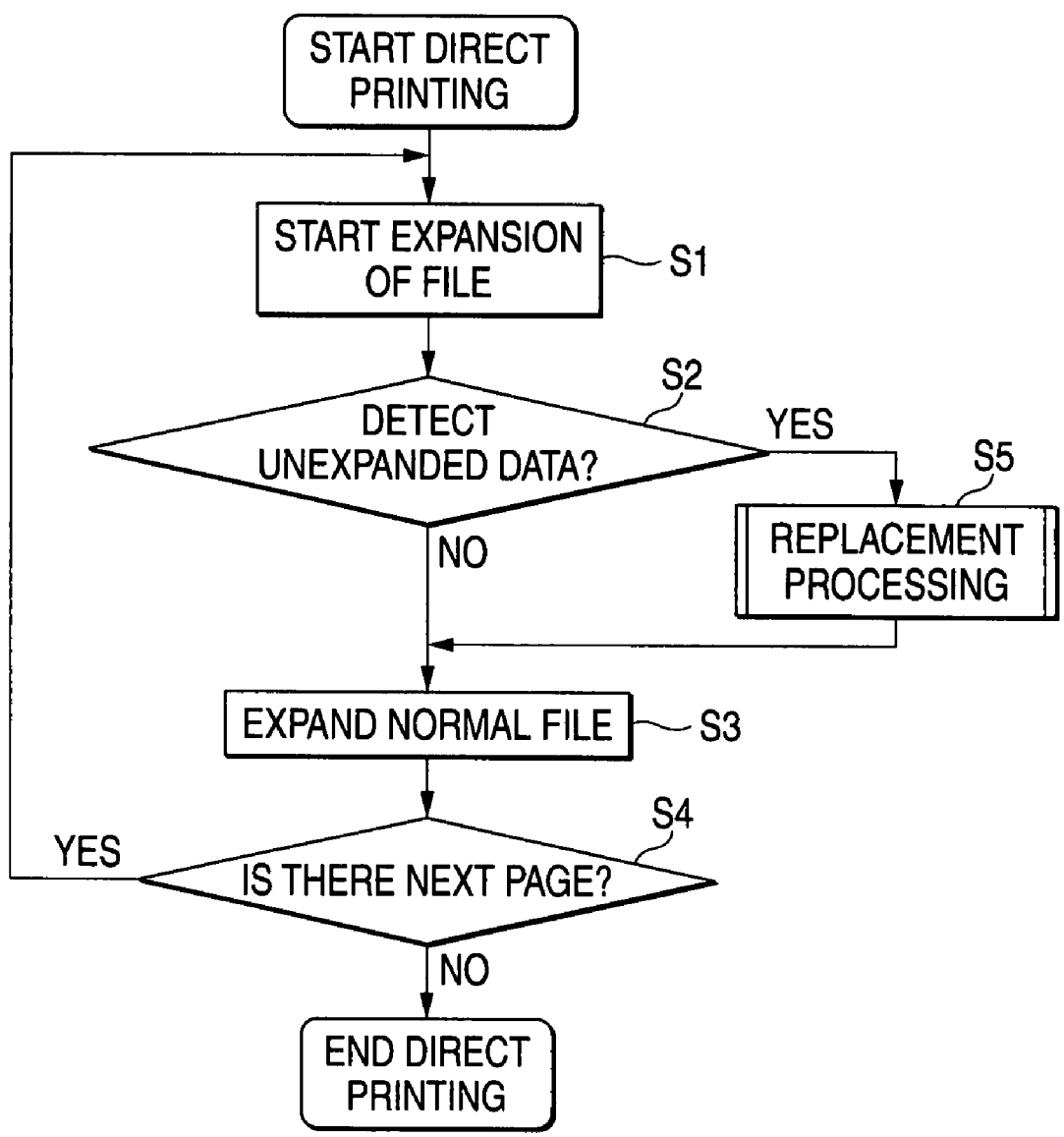
FIG. 2 is a flowchart showing a main routine of direct print processing.

When a direct print function is specified by predetermined operation performed by way of the operation unit 15 while the USB memory 17 is inserted into the printer 10, the control unit 14 performs control operation as shown in FIG. 2. In S1, the control unit 14 reads files in the USB memory 17 and starts processing for expanding data pertaining to the file into bitmap data (one example of unexpanded data). At this time, the control unit 14 acts as an expansion unit.

Figure 3:
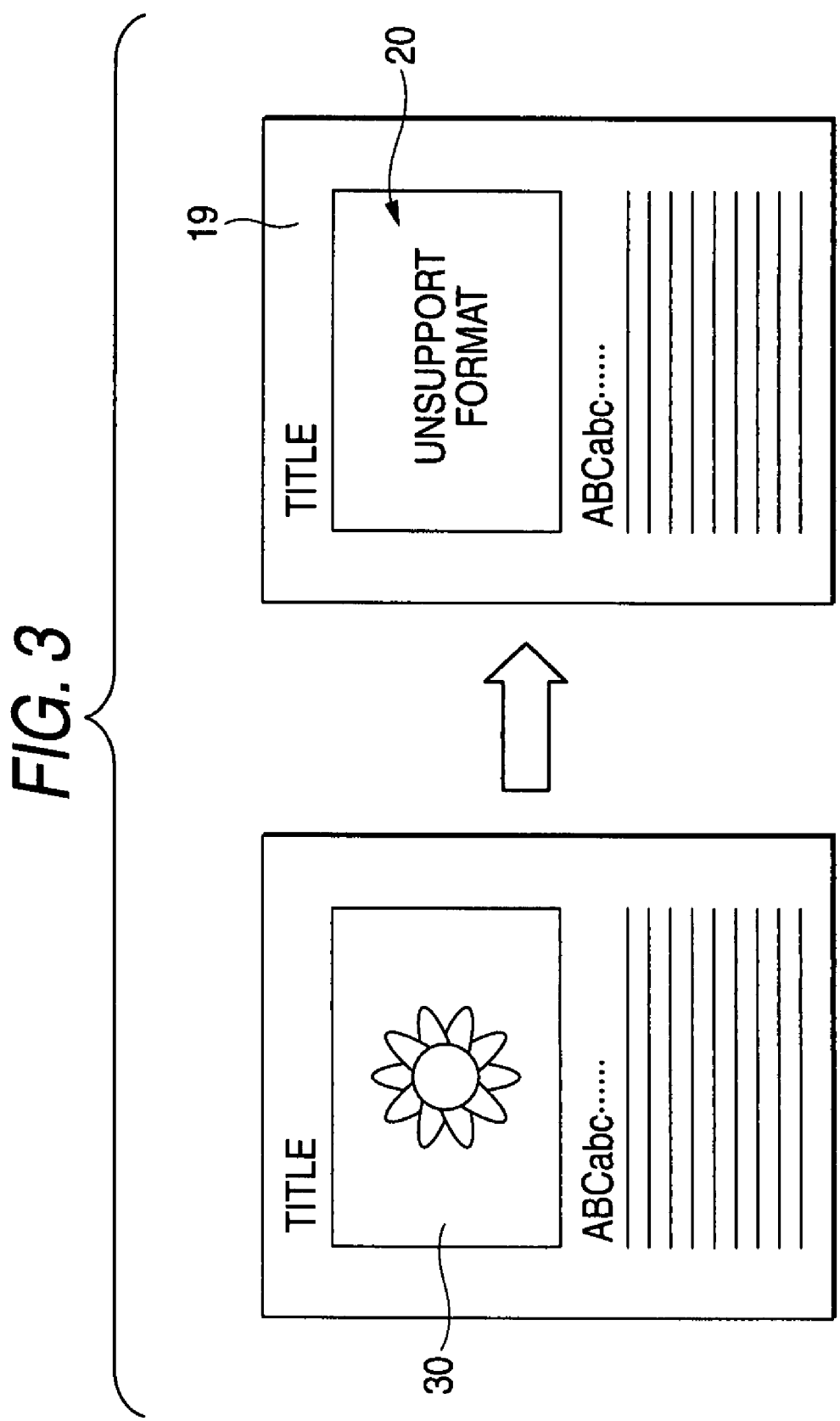
FIG. 3 is a diagrammatic illustration showing a relationship between an original image of a file and a replaced image (Partial Replacement Mode; Replacement with an error image)

Specifically, when a file being currently processed is a file of portable document format (PDF) type, expansion is performed in sequence in pages in accordance with information about a tree structure appended to the file, and each of the pages is expanded in sequence from the top of the page. For example, when a certain page of the file includes in sequence from the top a text, an image drawing, and a text as shown in FIG. 3 (a drawing on the left), data pertaining to the first text portion ("Title") are expanded first, and data pertaining to an image drawing 30 are expanded, and data pertaining to a text portion in a subsequent column ("ABCabc . . . ") are expanded finally.

When the file does not include the unexpanded data (NO in S2), expansion of one page is completed (S3). If the file being currently processed includes the next page (YES in S4), processing returns to S1. When the next page is not included (NO in S4), direct printing of the file being currently processed is completed. The control unit 14 converts the expanded bitmap data through expansion operation into a video signal for use in forming an image, and outputs the video signal to the print unit 11. Thereby, the print unit 11 prints an image originating from the file onto the sheet 19.

Meanwhile, when unexpanded data are detected during the course of expansion of a file (YES in S2), replacement processing is performed in S5 without aborting expansion of the file. At this time, the control unit 14 acts as an expansion control unit and a replacement unit.

(Partial Replacement Mode: Replacement with an Error Image)

Figure 4:
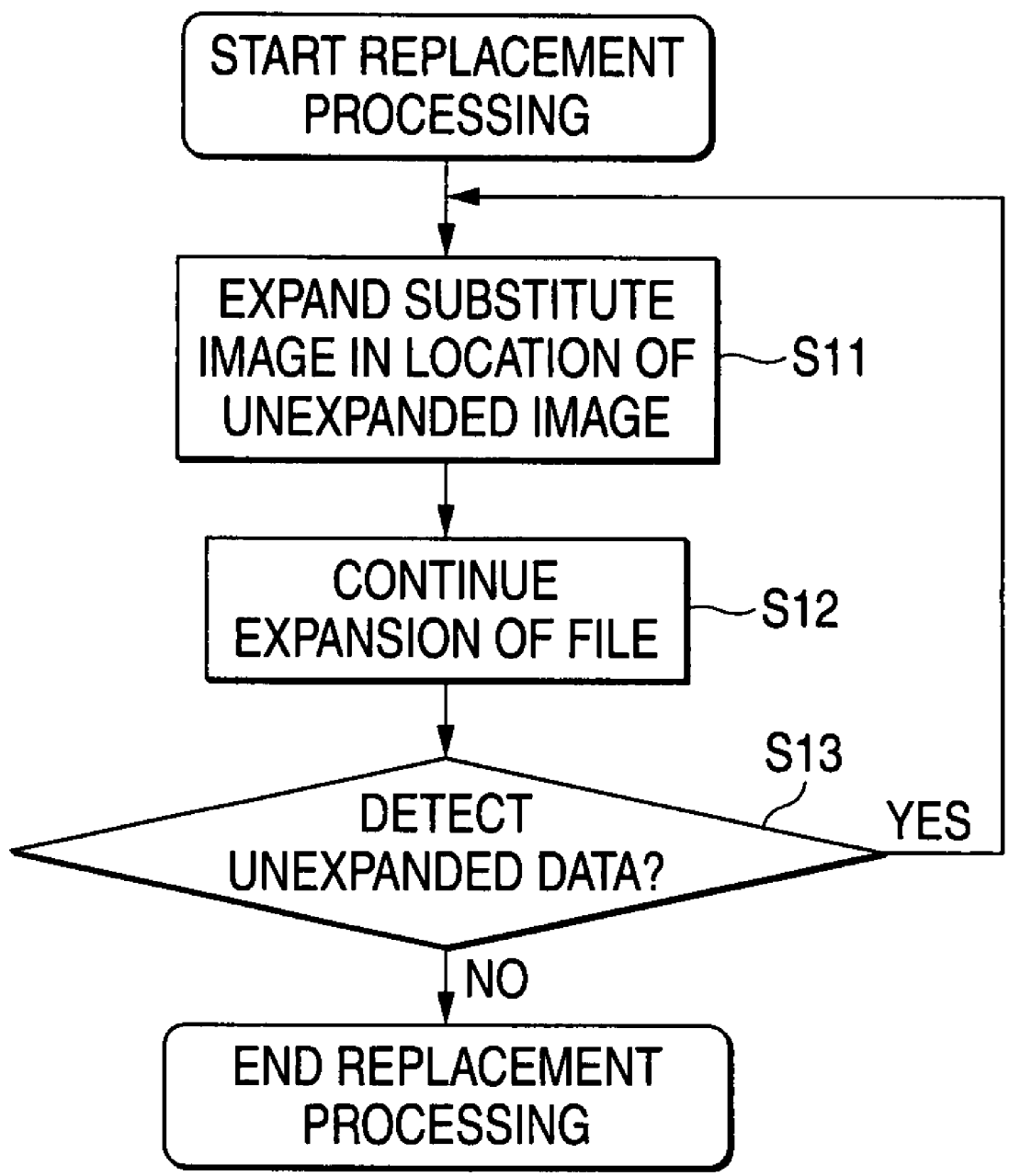
FIG. 4 is a flowchart showing replacement processing (Partial Replacement Mode; Replacement with an error image)

When the partial replacement mode has been selected by way of the operation unit 15 and when replacement of an unexpanded image with an error image 20 is selected, replacement processing shown in FIG. 4 is performed. For example, an image drawing 30 shown in FIG. 3 (left side) is an unexpanded image, the control unit 14 skips in S11 processing for expanding data pertaining to an image drawing 30. The error image 20 is read from the internal memory 18 as substitute data for the image drawing 30, and there is performed processing for replacing the image drawing 30 with the error image 20 that is of the same size as that of the image drawing 30 (an unexpanded image).

Subsequently, expansion of an unexpanded text area in a subsequent column is continued (S12). When unexpanded data are not detected on the same page (NO in S13), replacement processing is completed, and processing returns to S3 shown in FIG. 2. As shown in FIG. 3 (right side), the print unit 11 prints on the sheet 19 an image obtained as a result of replacement of the image drawing 30 (an unexpanded image) with the error image 20, and outputs the sheet.

Meanwhile, when unexpanded data are detected on the same page (YES in S13), processing returns to step S11 where an unexpanded image is replaced with the error image 20.

(Partial Replacement Mode: Replacement of an Unexpanded Image with Space)

Figure 5:
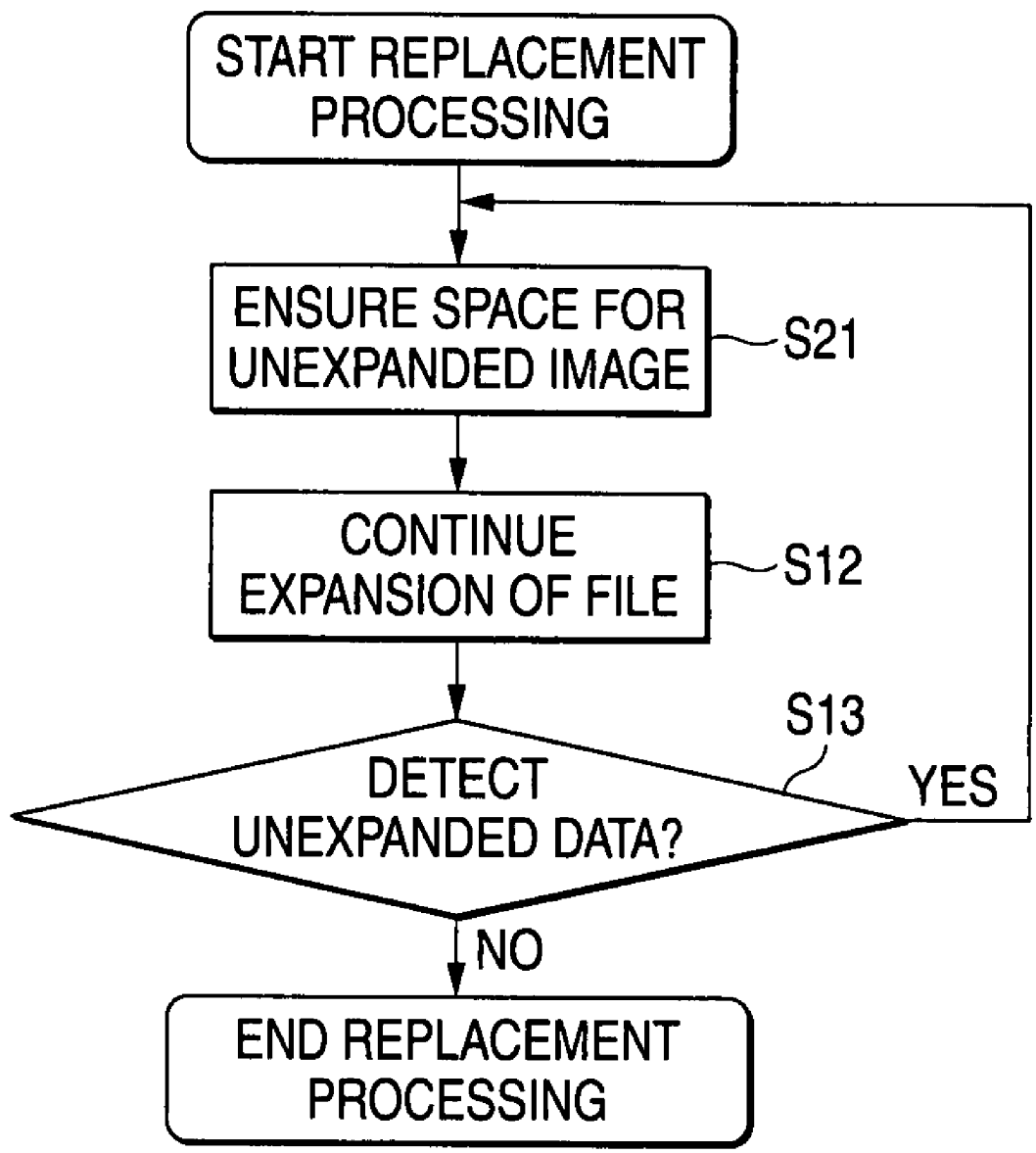
FIG. 5 is a flowchart showing replacement processing (Partial Replacement Mode; Replacement with space)
Figure 6:
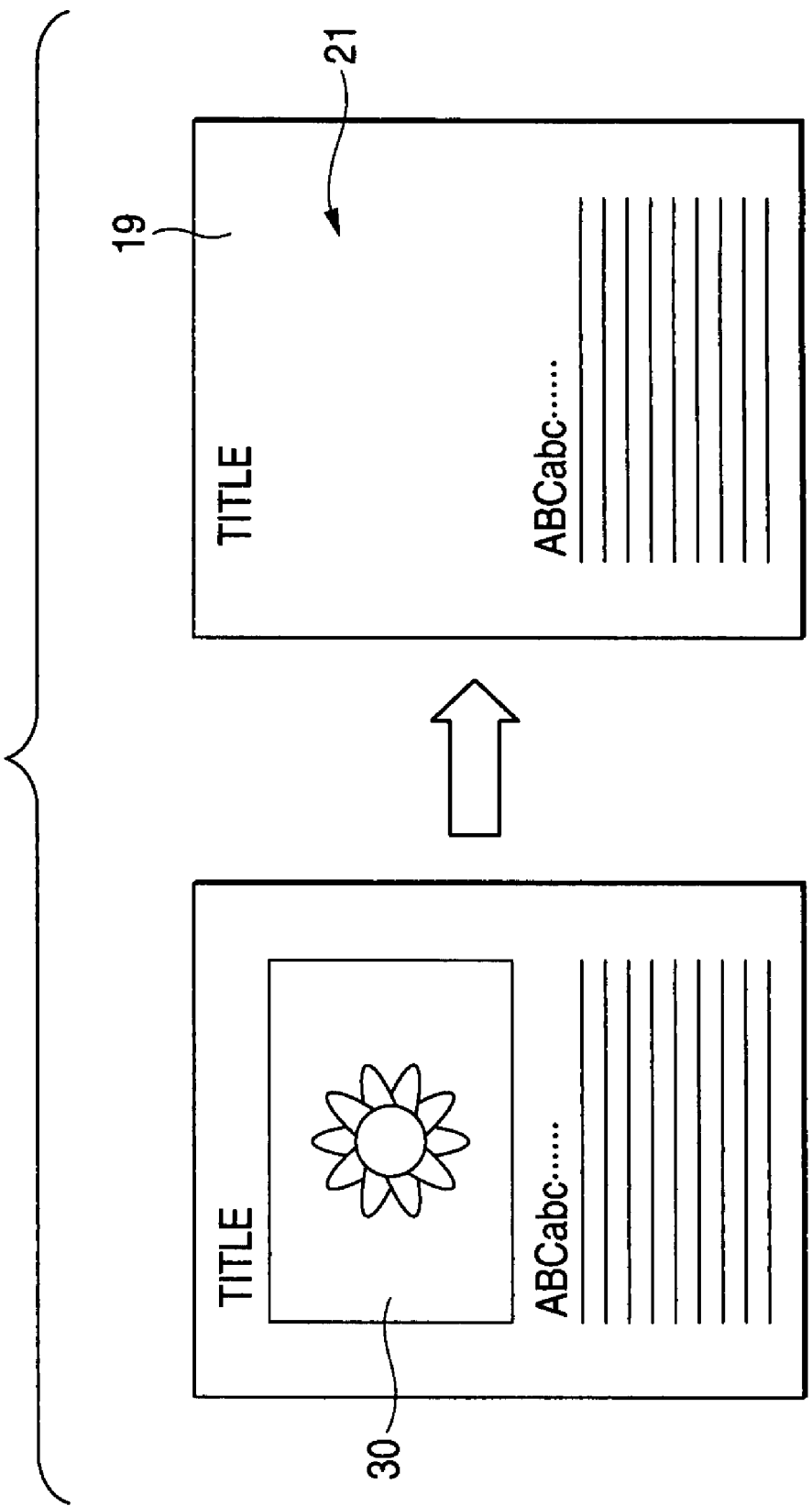
FIG. 6 is a diagrammatic illustration showing a relationship between an original image of a file and a replaced image (Partial Replacement Mode; Replacement with space)

When the partial replacement mode has been selected by way of the operation unit 15 and when replacement of an unexpanded image with the space 21 shown in FIG. 6 is selected, replacement processing shown in FIG. 5 is performed. In FIG. 5, processing identical with that shown in FIG. 4 is assigned the same reference numerals, and different reference numerals are assigned solely to different processing operations. In replacement processing performed this time, processing for expanding the data pertaining to the image drawing 30 is skipped in S21, and space area of the same size as that of the image drawing 30 is ensured. As a result, as shown in FIG. 6 (right side), the print unit 11 prints on the sheet 19 the image acquired by replacement of the image drawing 30 (an unexpanded image) with the space area 21, and the sheet is output.

(Partial Replacement Mode: Replacement of an Unexpanded Image with an Error Message Image)

Figure 7:
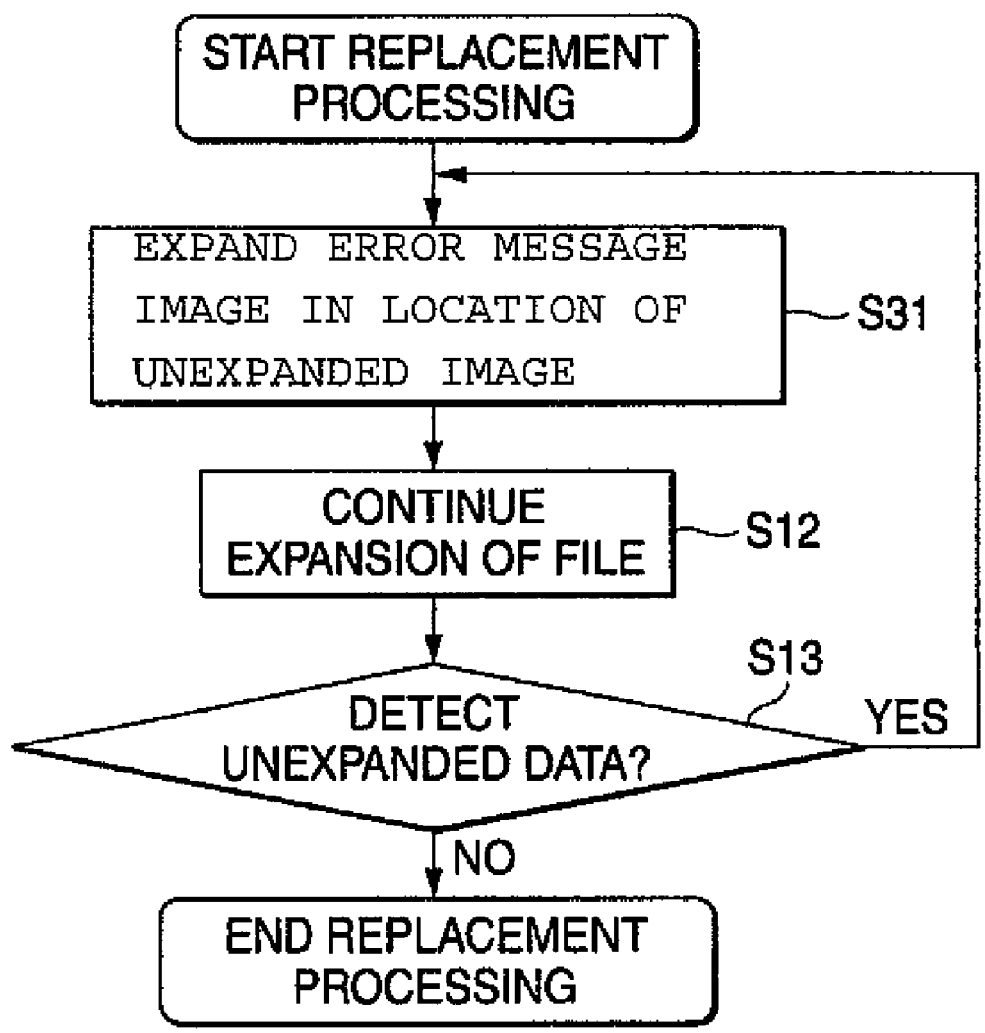
FIG. 7 is a flowchart showing replacement processing (Partial Replacement Mode; Replacement with an error message image)
Figure 8:
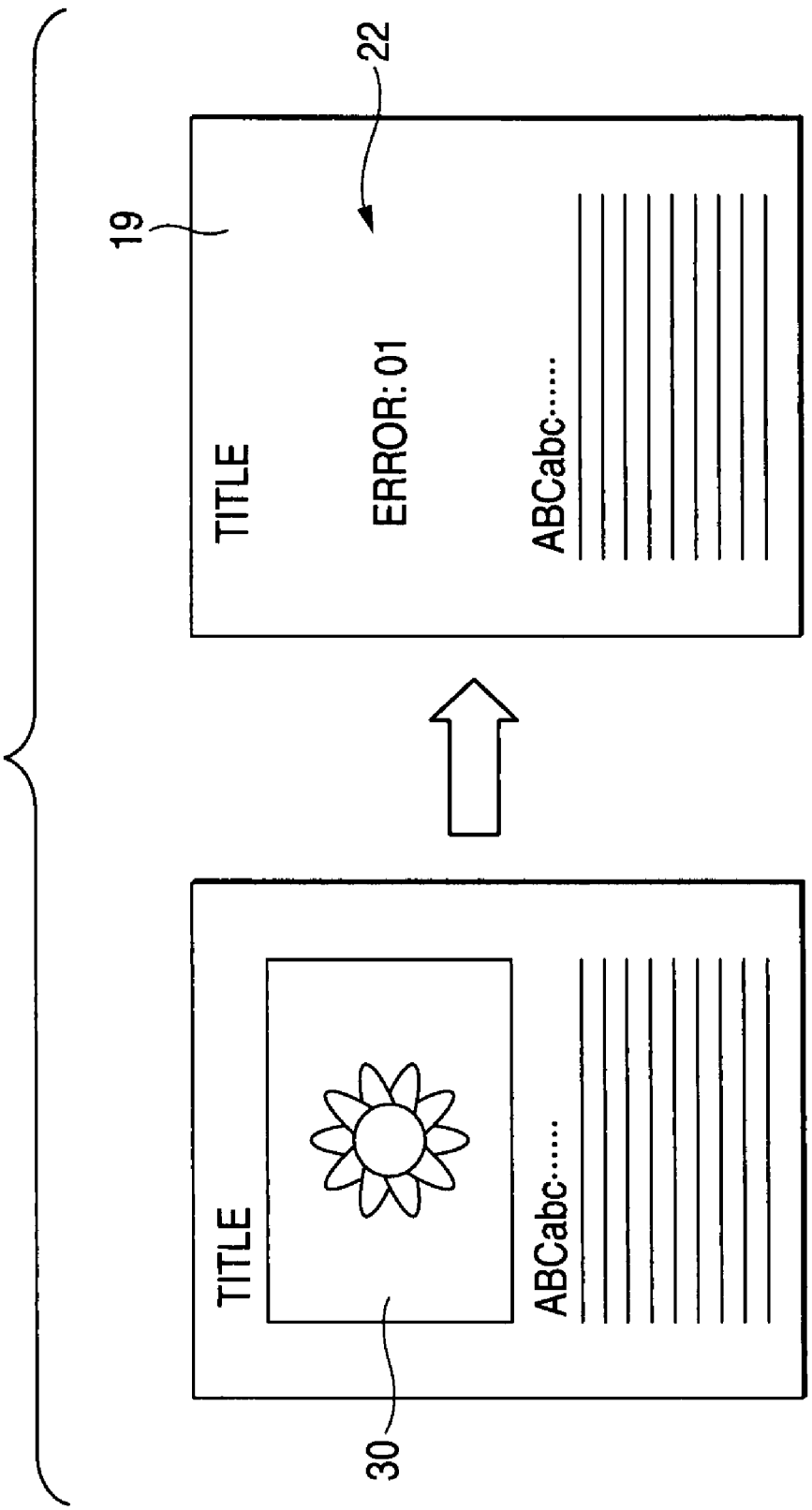
FIG. 8 is a diagrammatic illustration showing a relationship between an original image of a file and a replaced image (Partial Replacement Mode; Replacement with an error message image)

When the partial replacement mode has been selected by way of the operation unit 15 and when replacement of an unexpanded image with the error message image 22 shown in FIG. 8 is selected, replacement processing shown in FIG. 7 is performed. In FIG. 7, processing operations which are the same as those of processing shown in FIG. 4 are assigned the same reference numerals, and reference symbols are given solely to different operations. In replacement processing performed at this time, processing for expanding data pertaining to the image drawing 30 is skipped in S31. The error message image 22 is read from the internal memory 18 as substitute data for the image drawing 30, and there is performed processing for replacing the image drawing 30 (an unexpanded image) with the error message image 22 of the same size as that of the image drawing 30. As a result, as shown in FIG. 8 (a drawing on the right), the print unit 11 prints on the sheet 19 an image obtained by replacement of the image drawing 30 (an unexpanded image) with the error message image 22, and the sheet is output.

(Entire Page Replacement Mode: Replacement of an Unexpanded Image with an Error Image)

Figure 9:
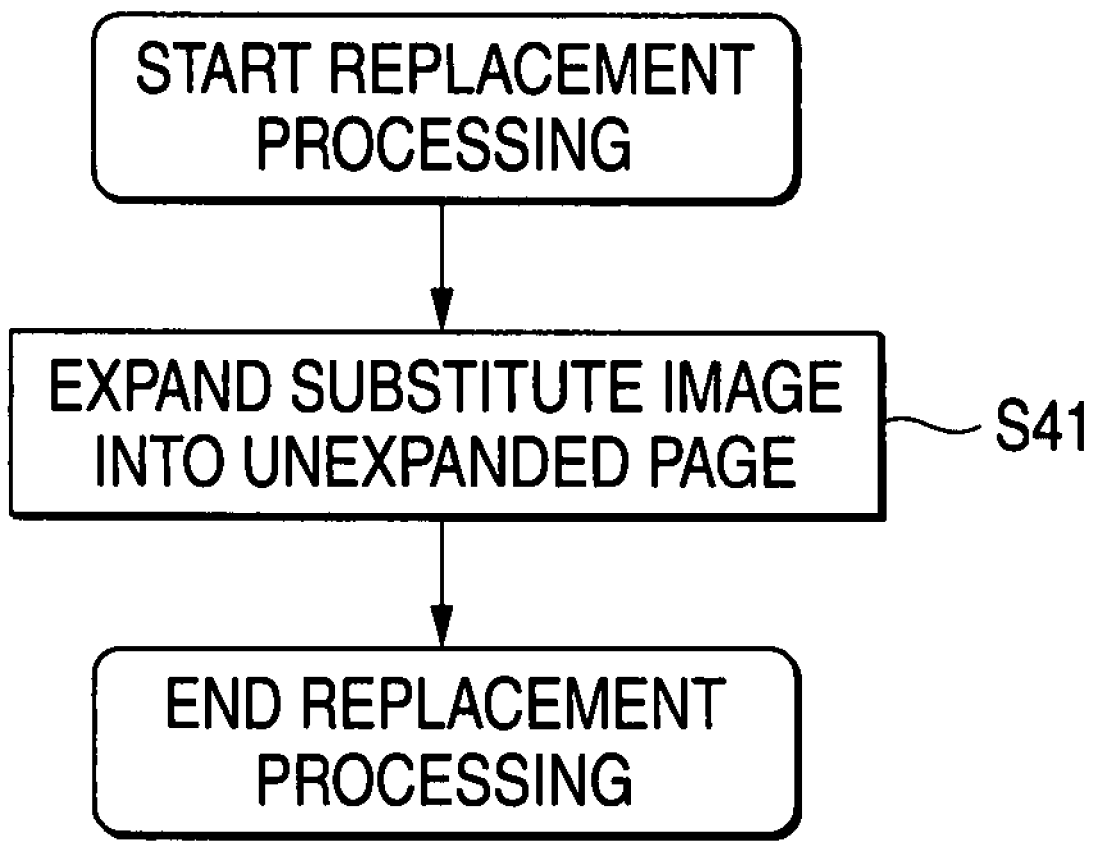
FIG. 9 is a flowchart showing replacement processing (Entire Page Replacement Mode; Replacement with an error image)
Figure 10:
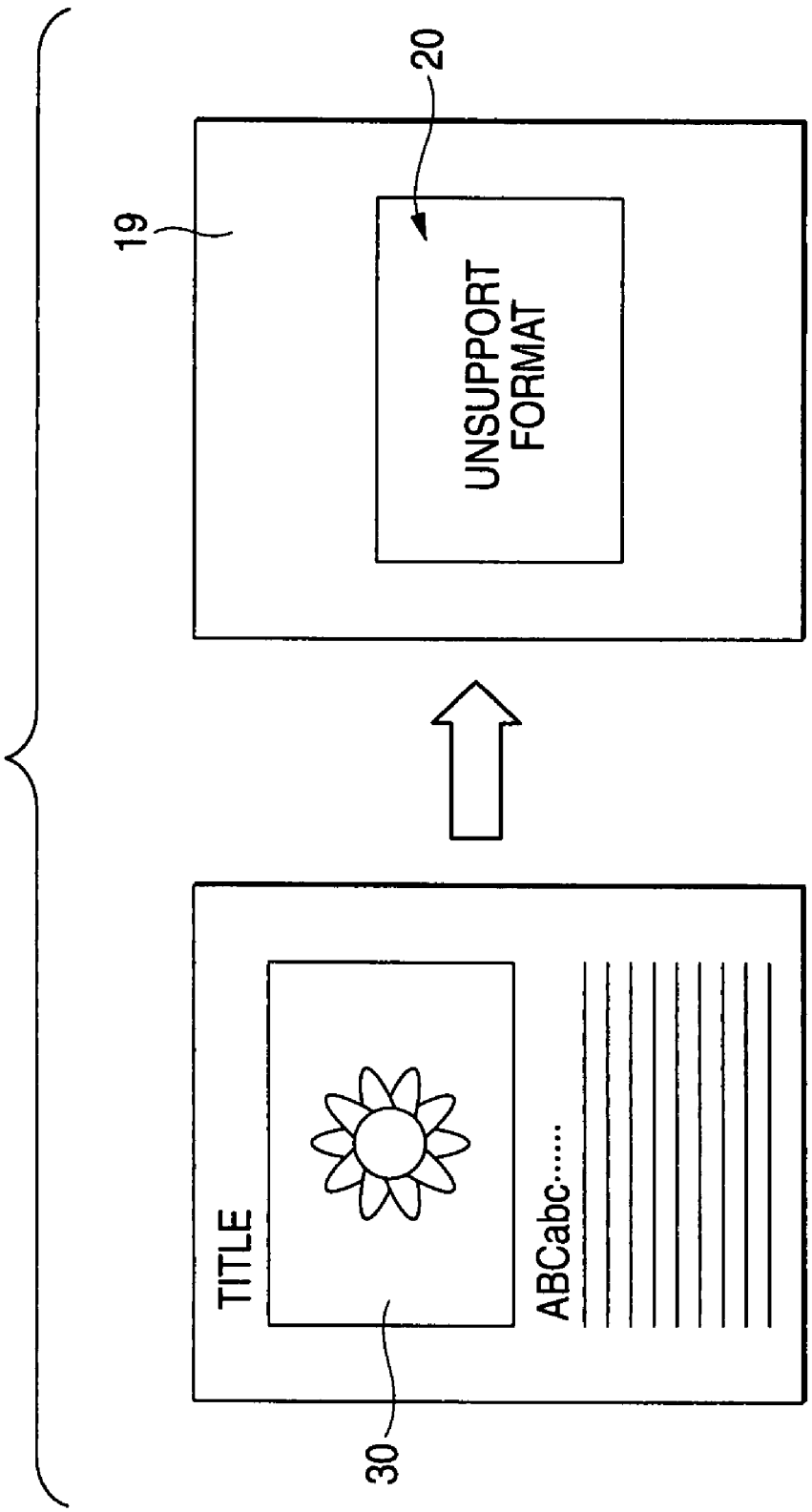
FIG. 10 is a diagrammatic illustration showing a relationship between an original image of a file and a replaced image (Entire Page Replacement Mode; Replacement with an error image)

When the entire page replacement mode has been selected by way of the operation unit 15 and when replacement of an unexpanded image with the error image 20 shown in FIG. 10 is selected, replacement processing shown in FIG. 9 is performed. For example, when the image drawing 30 shown in FIG. 10 (a drawing on the left) is an unexpanded image, the control unit 14 skips, in S41, processing for expanding all of sets of data (including a text in a subsequent column) subsequent to the image drawing 30 in connection with the page being currently processed, and data which have already been expanded in connection with the page are discarded. There is performed processing for reading the error image 20 from the internal memory 18 as substitute data for the image drawing 30 and inserting the error image 20 into the page. This error image 20 may also be of the same size as that of the image drawing 30 or a different size (e.g., the entire size of the sheet 19). Processing then proceeds to expansion of the next page (S4 in FIG. 2). As a result, as shown in FIG. 10 (right side), the print unit 11 prints on the sheet 19 an image obtained as a result of replacement of the entire page including the image drawing 30 (an unexpanded image) with a substitute image including the error image 20, and the sheet is output.

(Entire Page Replacement Mode: Replacement of an Unexpanded Image with Space)

Figure 11:
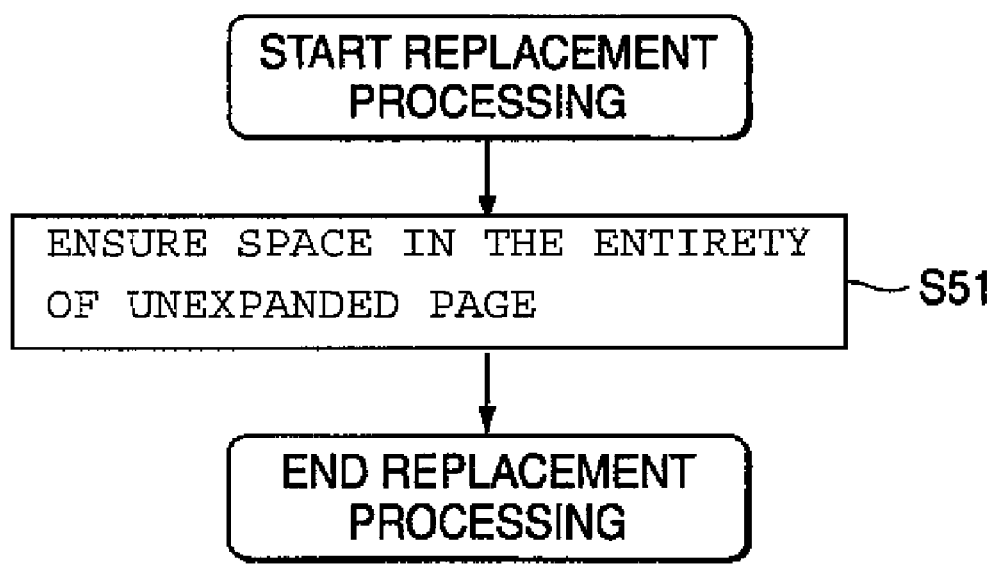
FIG. 11 is a flowchart showing replacement processing (Entire Page Replacement Mode; Replacement with space)
Figure 12:
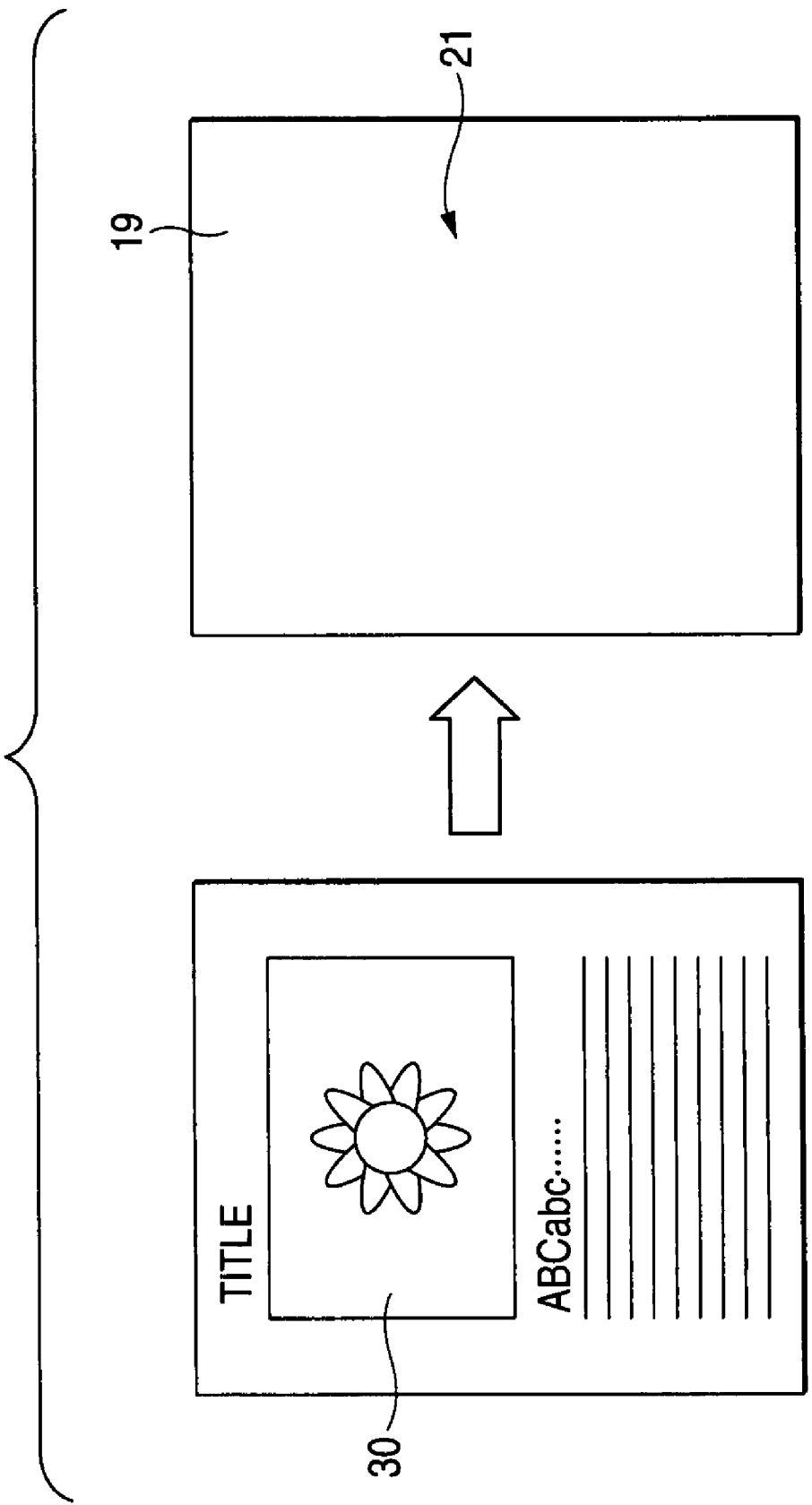
FIG. 12 is a diagrammatic illustration showing a relationship between an original image of a file and a replaced image (Entire Page Replacement Mode; Replacement with space)

When the entire page replacement mode has been selected by way of the operation unit 15 and when replacement of an unexpanded image with the space 21 shown in FIG. 12 is selected, replacement processing shown in FIG. 11 is performed. In replacement processing performed in this case, processing for expanding all sets of data pertaining to images (including a text in a subsequent column) subsequent to the image drawing 30 is skipped, in S51, in connection with the page currently being processed, and data having already been expanded in connection with this page are discarded. Space area is ensured in the entirety of this page. As a result, as shown in FIG. 12 (right side), the print unit 11 outputs the sheet 19 in blank without printing an image obtained as a result of replacement of the entire page including the image drawing 30 (an unexpanded image) with the space area 21, namely, without printing an image on the sheet 19.

(Entire Page Replacement Mode: Replacement of an Unexpanded Image with an Error Message Image)

Figure 13:
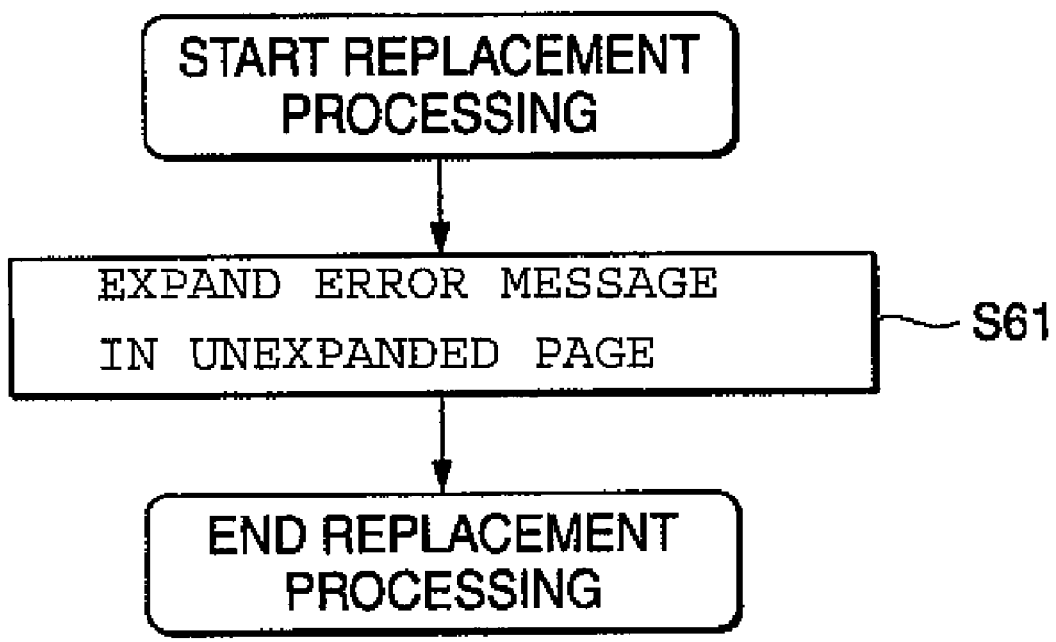
FIG. 13 is a flowchart showing replacement processing (Entire Page Replacement Mode; Replacement with an error message image)

When the entire page replacement mode has been selected by way of the operation unit 15 and when replacement of an unexpanded image with the error message image 22 shown in FIG. 14 is selected, replacement processing shown in FIG. 13 is performed. In S61, in connection with the page currently being processed, processing for expanding all sets of data pertaining to images (including a text in a subsequent column) subsequent to the image drawing 30 is skipped, and data having already been expanded in connection with this page are discarded. The error message image 22 is read from the internal memory 18 as substitute data for the image drawing 30, and there is performed processing for inserting the error message image 22 into the page. The error message image 22 may be of the same size as that of the image drawing 30 or a different size (e.g., the entire size of the sheet 19). Processing proceeds to processing for expanding the next page (S4 in FIG. 2). As a result, as shown in FIG. 14 (a drawing on the right), the print unit 11 prints, on the sheet 19, the image obtained as a result of replacement of the entire page including the image drawing 30 (an unexpanded image) with a substitute image including the error message image 22, and outputs the sheet.

Figure 15B:
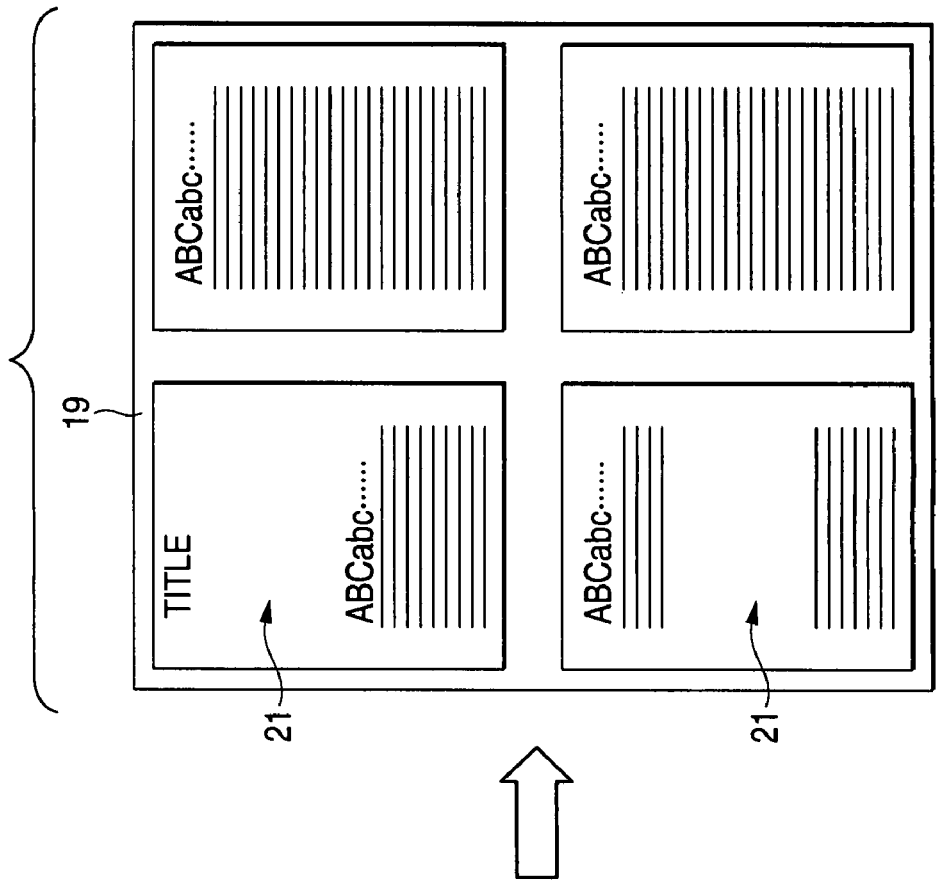
FIGS. 15A and 15B are exemplary diagrammatic illustrations showing a relationship between an original image of a file and a replaced image in N-in-1 printing.
Figure 15A:
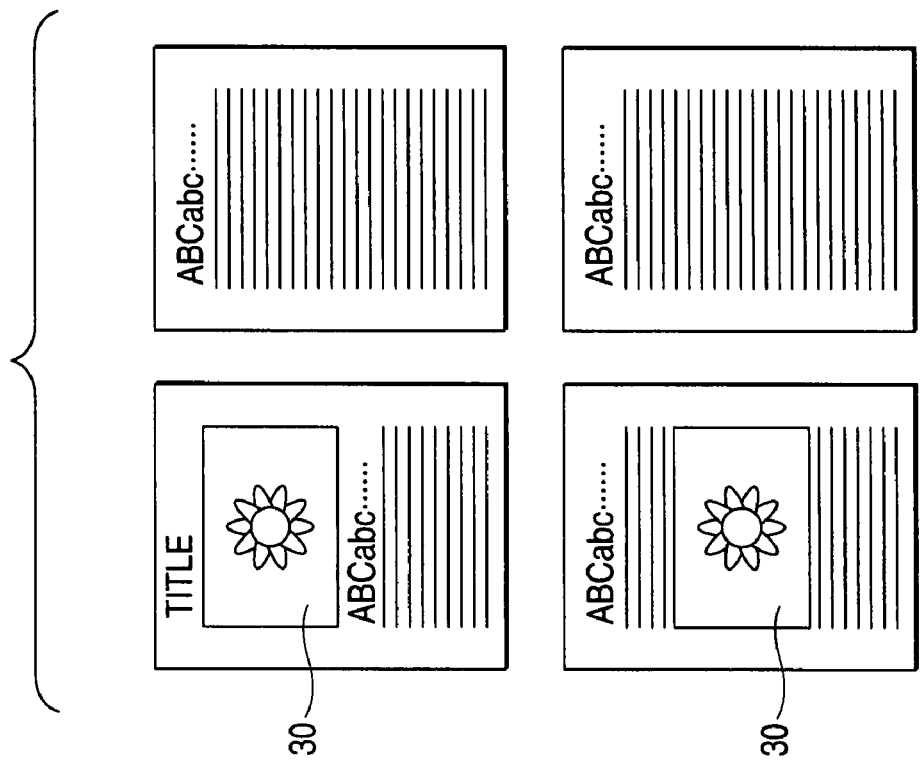
Figure 16A:
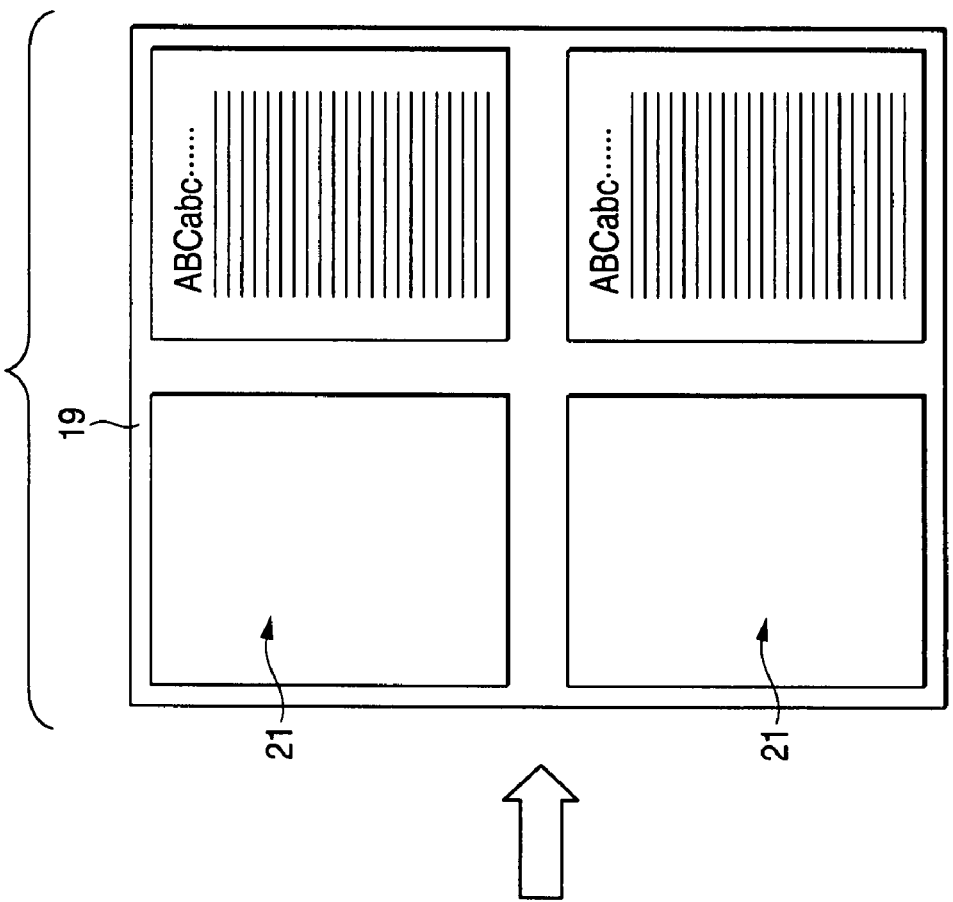
FIGS. 16A and 16B are other exemplary diagrammatic illustrations showing a relationship between an original image of a file and a replaced image in N-in-1 printing.
Figure 16B:
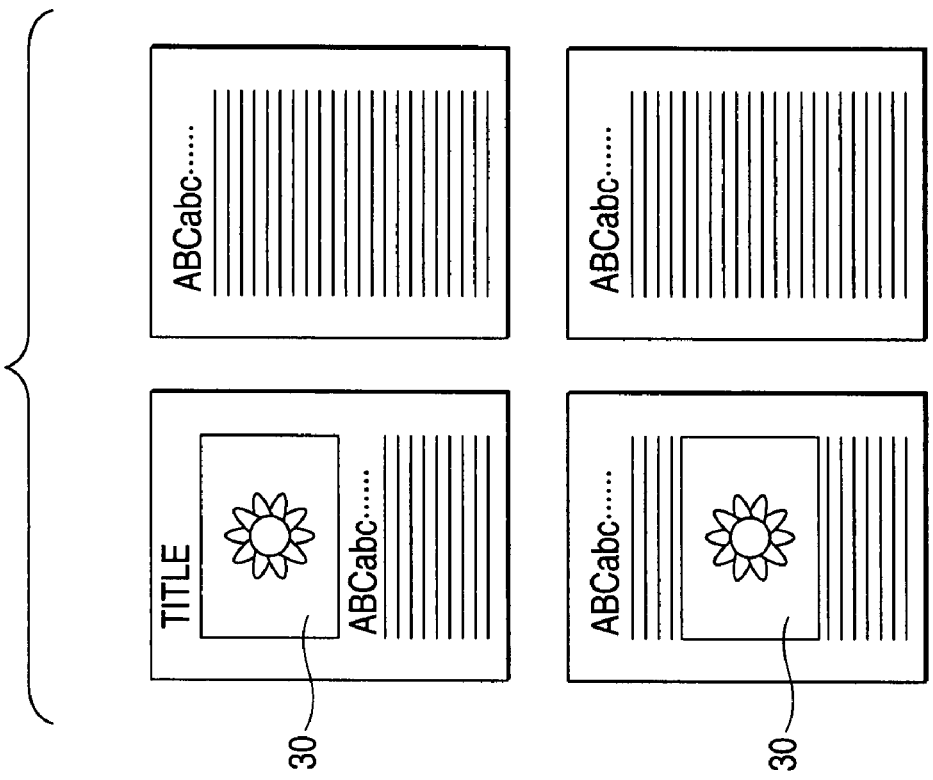

Incidentally, the print unit 11 may perform N-in-1 (or N-up) printing in which images of a plurality of pages are printed on a single sheet 19 in an arranged manner by scaling the images down. FIGS. 15A and 15B show one exemplary example of N-in-1 printing in which the print unit 11 prints on the sheet 19 a plurality of pages with replacing the image drawing 30 (an unexpanded image) 30 with the space area 21. Incidentally, the image drawing 30 (an unexpanded image) may be replaced with an error message image or an error image. FIGS. 16A and 16B show other exemplary example of N-in-1 printing in which the print unit 11 prints on the sheet 19 a plurality of pages with replacing the entire page including the image drawing 30 (an unexpanded image) with the space area 21. Further, the entire page including the image drawing 30 (an unexpanded image) may be replaced with an error message image or an error image.

According to the above aspects, even if a file includes unexpanded data, processing for expanding a file is continued by skipping processing for expanding the unexpanded data. Hence, the file can be printed to completion. Moreover, an unexpanded image corresponding to the unexpanded data or an entire page including the unexpanded image is replaced with a substitute image, so that the original can be printed without involvement of a page offset with reference to the original. The printer 10 can perform N-in-1 (or N-up) printing in which images of a plurality of pages are printed on a single sheet 19 in an arranged manner. However, at the time of N-in-1 printing, images of respective pages can be arranged in the sequence of pages which is originally identical with the sequence of pages of original data (document data stored in a storage medium), and hence the printer is particularly effective.

An unexpanded image, or the like, is replaced with a substitute image, and hence the user can ascertain, from the substitute image, the presence of an unexpanded image and the location of the unexpanded image.

Moreover, the present aspect is configured so as to print error information generated as a result of expansion of a file on the sheet 19 and to output the sheet. Accordingly, the user can readily ascertain the nature of the error having arisen from the error information on the finally-output sheet 19.

Moreover, in the entire page replacement mode, processing proceeds to an operation for expanding the next page without expanding subsequent data at a point in time when unexpanded data are detected, and hence useless expansion operation can be omitted.

Alternatively, there can be performed replacement processing in accordance with data, which are substitutes for a pattern corresponding to the user's preference, by selecting between the entire page replacement mode and the partial replacement mode, switching an unexpanded image to the error image 20, the space 21, or the error message image 22.

Moreover, using the error image 20 as substitute data enables the user to realize occurrence of an error. Further, when the printer 10 judges the nature of an error (e.g., whether the file includes data of an incompatible format, corrupt data, protected data that is, for example, prohibited to be printed out, or the like) and outputs the error message image 22 in accordance with a result of the judgment, the user can ascertain the nature of the error from the error message image 22. Use of the space area 21 enables the user to ascertain the presence of unexpanded data with reduction of the load of print processing.

<Other Aspects>

The present invention is not limited to the above aspects. For example, the following aspects also fall within the technical scope of the present invention.

In the above aspects, description has been given of a case where a notification unit is configured to print error information on the sheet 19 and output the sheet. However, the error information may be displayed on the display unit 12. Further, there may be adopted a configuration of illuminating an unillustrated display lamp or a configuration of issuing a warning sound.

Further, in the above aspects, description has been given of a case where the USB memory 17 is taken as an example storage medium. However, the storage medium may also be a memory card such as Compact Flash®, Smart Medium®, Memory Stick®, and the like. Moreover, the storage medium is not limited to such external memory and may also be the internal memory 18 incorporated in the printer 10.

Still further, in the above aspects, description has been given of a case where a file of PDF format is used as an example. However, the file is not limited to this type. For example, a file of tagged image file format (TIFF) may also be adopted. In this case, expansion operation is performed in accordance with attribute information about a tag. Now, in the case of a file of this TIFF type, one page is perceived as one image. Hence, the partial replacement mode cannot be applied. Accordingly, it is better to make an arrangement in such a way that, when a file is determined to be of TIFF format, the entire page replacement mode is selected automatically.

Still further, in the above aspects, description has been given of a case where the printer 10 performs N-in-1 (or N-up) printing in which images of a plurality of pages are printed on a single sheet 19 in an arranged manner as an example. However, the N-in-1 (or N-up) printing is not limited to this type. For example, the printer 10 may also print out images of a plurality of files on a single sheet as an index printing in an arranged manner.

Still further, in the above aspects, description has been given of a case where the printer 10 is used as an example of the image forming apparatus. However, the image forming apparatus may be a laser printer, a facsimile, a multi-function device having a printer function, a reading function (a scanner function), and the like.

Still further, in the above aspects, description has been given of a case where the sheet is made of paper. However, the sheet may also be made from plastic, such as an OHP sheet, or other materials.

According to another aspect of the invention, the image forming apparatus further includes a notification unit that indicates error information in accordance with the unexpanded data.

According thereto, the user can ascertain error information about unexpanded data.

According to still another aspect of the invention, the notification unit controls the print unit to print the error information on a sheet.

According thereto, a sheet on which error information including unexpanded data is printed can be generated. Accordingly, the user can readily ascertain the error information.

According to still another aspect of the invention, the image forming apparatus further includes a replacement unit that replaces at least the unexpanded data with a substitute data which is expandable.

According thereto, the user can specifically ascertain the location of the file where the unexpanded data has been included.

According to still another aspect of the invention, the substitute data corresponds to an entire page including the unexpanded data, and the replacement unit replaces the entire page with the substitute data.

In relation to a page including in some location the unexpanded data, even when the page is printed after only the portion including the unexpanded data has been replaced with substitute data, there may arise the case where the page becomes incomplete. Accordingly, in an exemplary configuration of the present invention, the entire page including the unexpanded data is replaced with substitute data.

According to still another aspect of the invention, the expansion control unit controls to skip the expanding of a page including the unexpanded data.

According thereto, wasteful expanding operations can be omitted.

According to still another aspect of the invention, the substitute data corresponds to the unexpanded data, and the replacement unit replaces the unexpanded data with the substitute data.

According thereto, print processing is performed while substituted data are placed at the position of the unexpanded data. Hence, the user can ascertain, from the position of the substitute image on the printed sheet, the location of the unexpanded data.

According to still another aspect of the invention, the substitute data includes an image data that indicates a print error.

According thereto, the user can clearly ascertain presence of the unexpanded data.

According to still another aspect of the invention, the substitute data corresponds to an empty space.

According thereto, presence of the unexpanded data can be ascertained while the load of print processing is reduced.

According to still another aspect of the invention, the substitute data includes a character data indicating error information corresponding to the unexpanded data.

According thereto, error information can be ascertained by a substitute image corresponding to substitute data.

According to still another aspect of the invention, the image forming apparatus further includes: a storage unit that stores a plurality of types of substitute data; and a selection unit that selects a specific substitute data, wherein the replacement unit replaces at least the unexpanded data with the selected specific substitute data.

According thereto, replacement processing involving use of substitute data of a pattern responsive to the user's preference can be ascertained.

According to still another aspect of the invention, the print unit prints images of a plurality of pages into a single sheet by scaling down the images.

According thereto, substitute data are inserted into a location of the unexpanded data. Hence, even at the time of N-in-1 (or N up) printing, respective images can be arranged in the original sequence of pages as that of original data (document data stored in a storage medium).

What is claimed is:

1. An image forming apparatus comprising:
   an acquisition unit configured to acquire a file stored in a storage medium that is removably attached to the image forming apparatus;
   an expansion unit configured to expand the acquired file;
   an expansion control unit configured to control the expansion unit to skip expanding of unexpanded data that the expansion unit is unable to expand from the file and to continue the expanding of the file;
   a printer configured to execute printing in accordance with expanded data from the file;

a replacement unit configured to replace at least the unexpanded data that the expansion unit is unable to expand with substitute data that is expandable by the expansion unit; and an operation unit configured to select an entire-page replacement mode and a partial replacement mode, wherein in the entire-page replacement mode, the replacement unit is configured to replace an entire page with the substitute data, and wherein in the partial replacement mode, the replacement unit is configured to replace the unexpanded data from a portion of the entire page that the expansion unit is unable to expand with the substitute data, such that the substituted data is placed at a position of the unexpanded data that the expansion unit is unable to expand, wherein the portion of the entire page comprising the unexpanded data that the expansion unit is unable to expand is less than the entire page.

2. The image forming apparatus according to claim 1, further comprising:
a notification unit configured to indicate error information in accordance with the unexpanded data.

3. The image forming apparatus according to claim 2, wherein the notification unit is configured to control the print unit to print the error information on a sheet.

4. The image forming apparatus according to claim 1, wherein the substitute data corresponds to an entire page comprising the unexpanded data when the entire-page replacement mode is selected.

5. The image forming apparatus according to claim 4, wherein the expansion control unit is configured to control the expansion unit to skip the expanding of data corresponding to a page comprising the unexpanded data when the entire-page replacement mode is selected.

6. The image forming apparatus according to claim 1, wherein the substitute data corresponds to the unexpanded data.

7. The image forming apparatus according to claim 1, wherein the substitute data comprises image data that indicates a print error.

8. The image forming apparatus according to claim 1, wherein the substitute data comprises an empty space.

9. The image forming apparatus according to claim 1, wherein the substitute data comprises character data indicating error information corresponding to the unexpanded data that the expansion unit is unable to expand.

10. The image forming apparatus according to claim 1, further comprising:
a storage unit configured to store a plurality of substitute data; and
a selection unit configured to select a specific substitute data from the plurality of substitute data,
wherein the replacement unit is configured to replace at least the unexpanded data with the selected specific substitute data.

11. The image forming apparatus according to claim 1, wherein the printer is configured to print images of a plurality of pages onto a single sheet by scaling down the images.

* * * * *